G. H. SMITH.
PHOTOGRAPH HOLDER.
APPLICATION FILED FEB. 24, 1914.
1,136,056.
Patented Apr. 20, 1915.
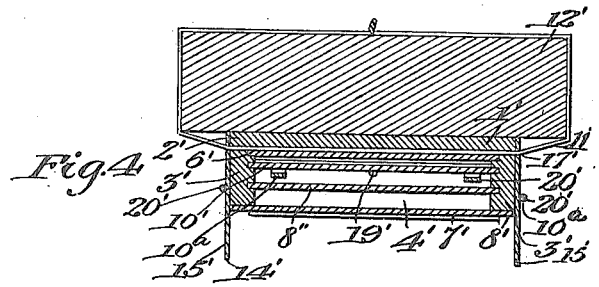
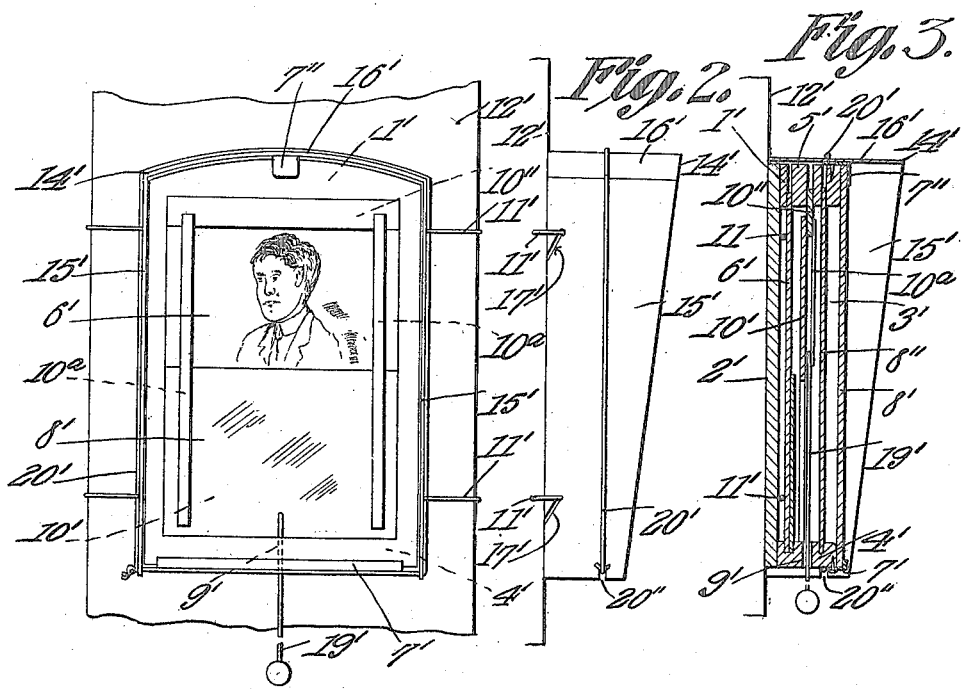
Witnesses
G. H. Smith,
Inventor
by
Attorneys

UNITED STATES PATENT OFFICE.

GEORGE HENERSON SMITH, OF WEBSTER, WEST VIRGINIA.

PHOTOGRAPH-HOLDER.

1,136,056.  Specification of Letters Patent.  Patented Apr. 20, 1915.

Application filed February 24, 1914. Serial No. 820,707.

*To all whom it may concern:*

Be it known that I, GEORGE HENERSON SMITH, a citizen of the United States, residing at Webster, in the county of Taylor and State of West Virginia, have invented a new and useful Photograph-Holder, of which the following is a specification.

The present invention appertains to photograph holders, and aims to provide a novel and improved photograph holder for use on tomb stones, monuments and the like.

It is the object of the present invention to provide a photograph holder of novel construction, and embodying novel means for attaching it to a tomb stone, grave marker, monument or the like.

It is also within the scope of the present invention, to provide a photograph holder of the character specified, which will be comparatively simple, and inexpensive in construction, as well as being readily applicable to various tomb stones and the like, and being desirable in other respects.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiments in the accompanying drawing, wherein:—

Figure 1 is a front view of the invention, as in use, with the photograph uncovered. Fig. 2 is a side elevation thereof. Fig. 3 is a longitudinal vertical section of the device, with the photograph covered. Fig. 4 is a cross section of the device.

The holder embodies a frame 1' including a back 2', sides 3', a bottom or lower end piece 4', and a top or upper end piece 5'. The photograph 6' is slidable through the top 5' of the frame, and between the sides 3' and is disposed adjacent the back 2'.

A flanged strip or seat member 7' is attached to the bottom 4' of the frame, and an angular retaining member 7'' is attached to the top or upper end piece 5' of the frame, whereby the glass or transparent outer panel 8' may be seated upon the strip 7' and may have its upper end engaged by the retaining member 7''. A second or inner transparent panel 8'' may be provided, the same being slidable through the top 5' and between the sides 3' of the frame.

A slide or shutter 10' is slidably mounted between the sides 3' of the frame directly in front of the photograph 6', and is normally maintained in raised or closed position, by means of rubber or elastic bands or elements 10$^a$ attached at their ends to the slide or shutter 10' and to a strip 10'' secured to the top 5' of the frame, the upper end of the slide or shutter 10' being adapted to move behind the strip 10'' when the slide or shutter is raised to closed position. The slide or shutter 10' has attached thereto a depending stem 19' working through an aperture 9' formed in the bottom 4' of the frame 1', whereby when the stem 19' is drawn downwardly, the slide or shutter 10' will be drawn downwardly, to open position, so as to expose the photograph to view.

To mount the frame 1' upon a tomb stone, or other object 12', wires or binding strands 11' are engaged through the sides 3' of the frame 1' over the back 2', behind the photograph 6', and are arranged to be tied about the tomb stone or other object.

A hood 14' preferably formed from suitable sheet metal, is of inverted U-shape, and comprises the sides or wings 15' and a top 16'. The hood 14' straddles the frame 1', and the rear or inner edges of the sides 15' are provided with inclined open slots 17' engageable over the wires 11', whereby when the hood is applied to the frame 1, the slots 17' being engaged over the wires 11', the hood in being forced downwardly, will cause the wires 11' to be tightened, those portions of the sides 15' intermediate the slots 17' and the rear edges of the said sides, serving as wedges to wedgedly engage between the tomb stone and the wires 11'.

The hood 14' is locked or secured in place by means of a wire or band 20' embracing the hood, and passing below the bottom 4' of the frame, the lower ends of the sides 15' being provided with notches 20'' receiving the binding wire or band 20' to prevent the displacement thereof. Thus, the binding wire 20' locks the hood 14' in place, and prevents the same from rising off of the frame 1'. When the retaining or locking member 20' is loosened or untied, the hood 14' may be raised out of engagement with the frame 1', whereby the wires 11' may be loosened, and readily removed from the tomb stone.

From the foregoing, taken in connection with the drawing, the advantages and capabilities of the present invention will be obvious without further comment, it being noted that the objects aimed at have been carried out satisfactorily.

Having thus described the invention, what is claimed as new is:—

1. A holder of the character described, comprising a frame, strands threaded through the frame and arranged to be wrapped around an object, an inverted U-shaped hood straddling the frame, the rear edges of the sides of the hood having inclined slots engaging the said strands, and means for locking the hood upon the frame.

2. A holder of the character described, comprising a frame, strands threaded through the frame and arranged to be wrapped around an object, an inverted U-shaped hood straddling the frame, the rear edges of the sides of the hood having inclined slots engaging the said strands, and means embracing the hood and engaging the lower end of the frame to lock the hood in place.

In testimony that I claim the foregoing as my own, I have hereto affixed my signature in the presence of two witnesses.

GEORGE HENERSON SMITH.

Witnesses:
L. B. NIXON,
J. P. WHITE.

Copies of this patent may be obtained for five cents each, by addressing the "Commissioner of Patents, Washington, D. C."